United States Patent [19]

Yaguchi

[11] Patent Number: 5,412,847
[45] Date of Patent: May 9, 1995

[54] LOOSE-BOSS TOP ROLLER

[75] Inventor: Yasunori Yaguchi, Aichi, Japan

[73] Assignee: Nihonbosekiyohin Laboratory Co., Ltd., Aichi, Japan

[21] Appl. No.: 147,500

[22] Filed: Nov. 4, 1993

[30] Foreign Application Priority Data

Jun. 30, 1993 [JP] Japan .................. 5-186724

[51] Int. Cl.⁶ ............................ D01H 5/74
[52] U.S. Cl. ..................... 19/295; 492/16; 19/258
[58] Field of Search .......... 19/295, 258, 259, 294; 492/16, 17, 18, 19, 20

[56] References Cited

U.S. PATENT DOCUMENTS

| | | | |
|---|---|---|---|
| 2,771,658 | 11/1956 | Morrill | 492/16 |
| 2,885,247 | 5/1959 | Schlums | 492/16 |
| 2,948,024 | 8/1960 | Swanson | 492/16 |
| 2,950,507 | 8/1960 | Keyser | 492/16 |
| 3,008,194 | 11/1961 | Sommer | 492/16 |
| 3,052,953 | 9/1962 | Swanson | 492/16 |
| 3,345,722 | 10/1967 | Stahlecker | 429/16 |
| 3,375,562 | 4/1968 | Jacob et al. | 492/16 |
| 3,397,439 | 8/1968 | Hanau | 492/16 |

*Primary Examiner*—Clifford D. Crowder
*Assistant Examiner*—Larry D. Worrell, Jr.
*Attorney, Agent, or Firm*—Burgess, Ryan & Wayne

[57] ABSTRACT

A loose-boss top roller includes an arbor inserted into a loose-boss on which a hard rubber material is fixed, needle bearings inserted between the loose-boss and the arbor in both ends of the loose-boss, one end of each of a pair of joints being inserted and fixed into an end of the loose-boss out of contact with the needle bearings, end bushes fixed on both ends of the arbor by screws, and thrust ball bearings inserted between thrust washers which are placed in hollow portions of the end bushes and thrust washers which are attached to the other ends of the joints.

4 Claims, 2 Drawing Sheets

LOOSE-BOSS TOP ROLLER

BACKGROUND OF THE INVENTION

The present invention relates to a loose-boss top roller having a simple construction in which a loose-boss is taken out of an arbor which is attached to a cotton spinning frame.

As a top roller of this kind, end bushes are fixed to both ends of an arbor, needle bearings are attached near both ends of the arbor and ball bearings are inserted into ball-grooves of the arbor near the needle bearings. Also, a hard rubber material is fixed to the outside of the loose-boss which is positioned to the outside of the ball bearings and the needle and the ball bearings are respectively inserted into the ball-grooves of the loose-boss. Furthermore, oiling holes are respectively formed from the ends of the arbor to the needle bearings along the center axis of the arbor and caps cover the ends of the arbor to prevent leakage of lubricant.

When the top rollers constituted as shown in FIG. 1 are mounted on a cotton drawing machine, cotton yarns are passed and drawn between the top rollers and under rollers.

However, in such top rollers, the surface of the hard rubber material is worn by the passed cotton yarns and grooves are so formed on the hard rubber material while the cotton yarns are drawn that the required pressure is not added on the cotton yarn. In such case, the loose boss is taken out of the arbor and is attached to a grinding machine, the loose-boss is rotated and the hard rubber material is ground by the grinding machine.

In this top roller, however, for inserting the ball bearing into the inside of the loose-boss, the arbor, without fixing the end bushes in both ends thereof, is inserted into the inside of the loose boss, the ball-groove of the arbor is united with the ball-groove of the loose-boss and a predetermined number of balls are inserted between the ball-grooves of the arbor and the loose-boss by shifting the arbor to one side of the loose-boss. Then, the balls are uniformly positioned in the grooves of the arbor and the loose-boss by shifting the arbor to the center of the loose-boss and the balls are set by a retainer. After the ball bearings are inserted into the loose-boss, needle bearings are inserted and fixed between the arbor and the loose-boss and the end bushes are fixed on both ends of the arbor by screws.

Accordingly, in the top roller, because the ball bearings are inserted between the ball-grooves of the arbor and the loose boss, the loose-boss is taken off from the arbor. Therefore, because the hard rubber material of the loose-boss is ground in the state when the arbor is fixed in the loose-boss, the surface of the hard rubber material is not finished finely.

Also, because a large weighting of 30 Kg is added to this top roller and bending stress is centralized to the ball-grooves, the arbor is easy to bend as, for instance, the center of the arbor is bent more than 0.5 mm when the bending stress is added to the arbor. Also, the boring of the oiling hole is difficult because the oiling hole in the center axis of the arbor is small and deep. In this top roller, the oiling amount is insufficient because the loose-boss and the arbor are not disjointed and the amount of oiling is not visible.

SUMMARY OF THE INVENTION

It is, therefore, the primary object of the present invention to provide a loose-boss top roller in which a loose-boss is easily taken off from an arbor and the loose-boss can be ground.

It is another object of the present invention to provide a loose-boss top roller in which bending of the arbor is not produced and the strength of the arbor is not weakened.

It is skill another object of the present invention to provide a loose-boss top roller in which there is a sufficient amount of oiling.

In order to accomplish the above and other objects, the present invention comprises a loose-boss on which a hard rubber material is fixed, an arbor inserted into the loose-boss, needle bearings are inserted between the loose-boss and the arbor at both ends of the loose-boss, joints, each with one end thereof inserted and fixed into the loose-boss so as not to contact the needle bearings respectively, end bushes fixed on both ends of the arbor by screws, and thrust ball bearings inserted between thrust washers inserted in hollow recesses of the end bushes and thrust washers of the joints.

DESCRIPTION OF THE PREFERRED EMBODIMENTS

Figure 1:
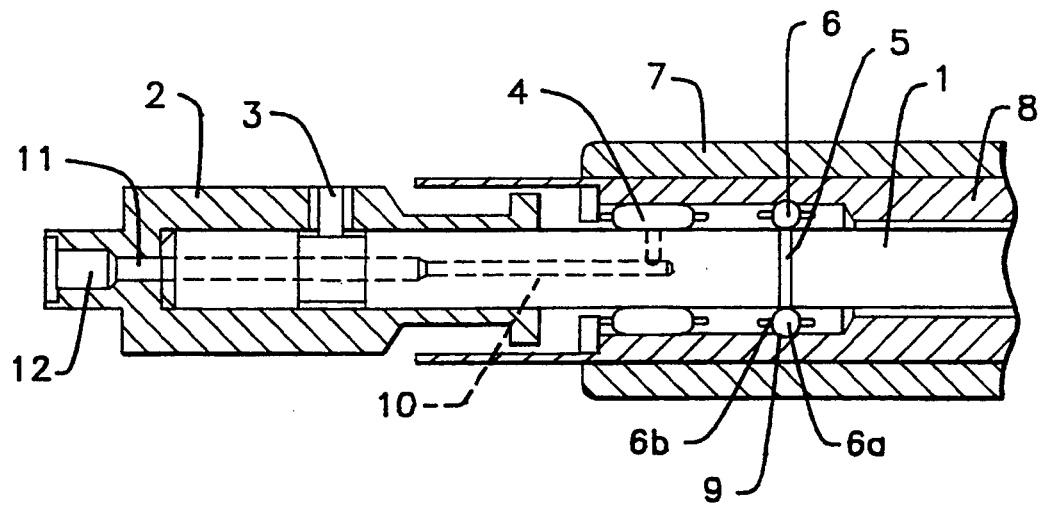
FIG. 1 shows a sectional view of one side of a loose-boss top roller according to the prior art.

Referring to FIG. 1, an end bush 2 is fixed on one side of arbor 1 by screw 3. A needle bearing 4 is provided near the end of the end bush 2, and a ball bearing 6 is inserted into a ball-groove 5 of the arbor 1. A loose-boss 8 on which a hard rubber material 7 is fixed is provided on the needle bearing 4 and the ball bearing 6, the ball bearing 6 being inserted into a ball-groove 9 of the loose-boss 8.

An oiling hole 10 is found from the center of the end of the arbor 1 to the needle bearing 4 and is connected to an oiling hole 11 of the end bush 2. The end of the oiling hole 11 is covered by a cap 12 to prevent leakage of lubricant.

Since both ends of the top roller are the same, only one side of the top roller is described in FIG. 1.

When the top rollers constituted as shown above are mounted on a cotton drawing machine, cotton yarns are passed and drawn between the top rollers and under rollers.

However, in such a top roller, the surface of the hard rubber material 7 is worn by the passed cotton yarns and grooves are formed on the hard rubber material 7 while the cotton yarns are drawn so that the required pressure is not added on the cotton yarn. In such a case, the loose-boss 8 is taken out of the arbor 1 and is attached to a grinding machine, the loose boss 8 is rotated and the hard rubber material 7 is ground by the grinding machine.

In this top roller, however, for inserting the ball bearing 6 into the inside of the loose-boss 8, the arbor 1, without fixing the end bushes in both ends thereof, is inserted into the inside of the loose boss 8, the ball-groove 5 of the arbor 1 is joined with the ball-groove 9 of the loose-boss 8 and a predetermined number of balls 6a are inserted between the ball-grooves 5 of the arbor 1 and the loose-boss 8 by shifting the arbor 1 to one side of the loose-boss 8. Then, the balls are uniformly positioned in the grooves of the arbor and the loose-boss by shifting the arbor to the center of the loose-boss and the balls 6a are set by a retainer 6b. After the ball bearings 6 are inserted into the loose-boss 8, needle bearings 4 are inserted and held between the arbor 1 and the loose-boss 8, and the end bushes 2 are fixed on both ends of the arbor 1 by screws.

Accordingly, in the top roller, because the ball bearings 6 are inserted between the ball-grooves 5 and 9 of the arbor 1 and the loose-boss 8, the loose-boss 8 is removed from the arbor 1. Therefore, because the hard rubber material 7 of the loose-boss 8 is ground in the state where the arbor 1 is fixed in the loose-boss 8, the surface of the hard rubber material 7 is not finely finished.

Also, because a large weighting of 30 Kg is added to this top roller and bending stress is centralized to the ball-grooves 5 of arbor 1, the arbor 1 is easy to bend and for instance, the center of the arbor 1 is bent larger than 0.5 mm when the bending stress is added to the arbor 1. Also, it is difficult to bore the oiling hole 10 because the oiling hole 10 in the center axis of the arbor 1 is small and deep. In this top roller, the oiling amount is insufficient because the loose-boss 8 and the arbor 1 are not disjointed and the amount of oiling is not visible.

Figure 2:
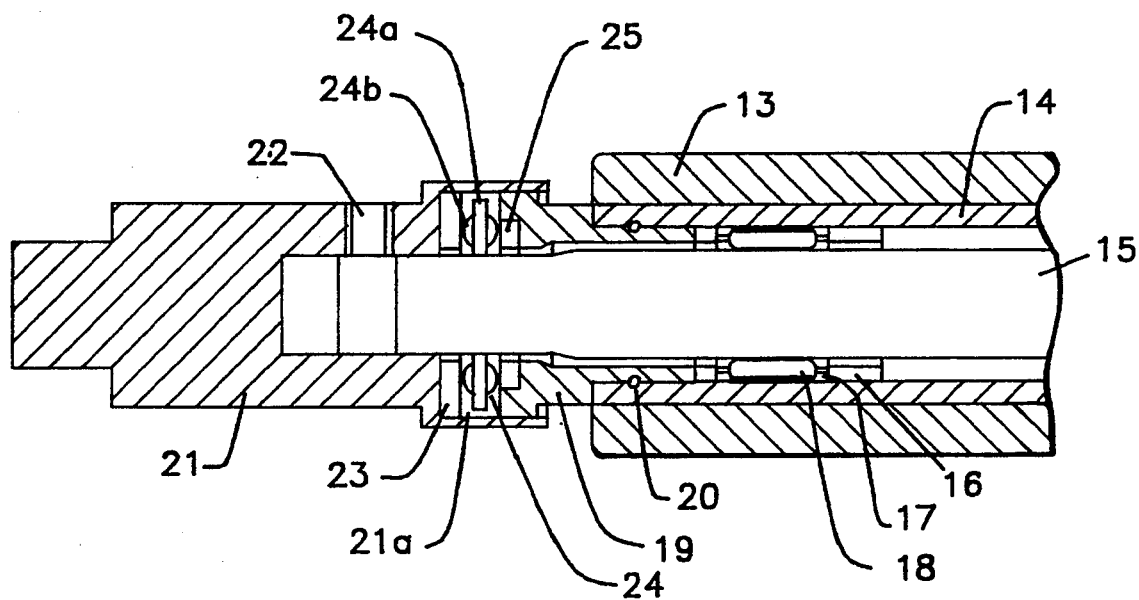
FIG. 2 shows a sectional view of one side of the loose-boss top roller according to one embodiment of the present invention.

Referring to FIG. 2, in the loose-boss top roller according to the present invention, an arbor 15 is inserted into a through hole of a loose-boss 14 on which a hard rubber material 13 is fixed. A washer 16 is inserted into the inside of the loose-boss 14, and the inside of the loose-boss 14 near the washer 16 is hardened and ground. A needle bearing 18 is inserted between the loose-boss 14 and the arbor 15 near the washer 16, and one end of a joint 19 is inserted into the through hole of the loose-boss 14 to open a space from the washer 16 while not preventing rotation of the needle bearing 18. A snap-ring 20 is inserted between the joint 19 and the loose-boss 14 to fix the joint 19 with the loose-boss 14, and the joint 19 is taken off from the loose-boss 14 by drawing the joint 19.

The end of the arbor 15 is inserted into the center hole of the end bush 21 and the end bush 21 is fixed to the arbor 15 by a screw 22. A thrust washer 23 and a thrust ball bearing 24 consisting of a retainer 24a and ball 24b are inserted into the hollow recess 21a of end bush 21 and the space between the thrust washer 23 and the other end of the joint 19 is formed to rotate the thrust ball bearing 24.

Since both ends of the loose-boss top roller are the same, only one side of the top roller is described in FIG. 2.

In the loose-boss top roller of the present embodiment which is constructed as shown in FIG. 2, the end bush 21 is taken off the arbor 15 by loosening the screw 22 and then the thrust washer 23, the thrust ball bearing 24 and the thrust washer 25 are taken off the arbor 15. Furthermore, when the joint 19 is pulled from the loose-boss 14, the loose-boss 14 is simply taken off the arbor 15.

In the loose-boss top roller according to the present invention, because the end bush 21 is taken off the arbor 15 by loosening the screw 22 and the joint 19 is taken off the loose-boss 14, disjointing work can be simply performed. Also, in the present invention, because the thrust ball bearing 24 is used between the loose-boss 14 and the end bush 21 through the joint 19 and a ball-groove and an oiling hole are not provided in the arbor 15, the bend of the arbor 15 is small. Thus, the rotation of the top roller is stabilized and the life of the bearing is prolonged. Furthermore, in the present invention, because the loose-boss 14 is taken off the arbor 15, the bearing portion can be seen, the bearing wear and the condition of the lubricant are visible; oiling is performed at the site of the bearing. Therefore, the preservation of the top roller is sure and easy.

Figure 3:
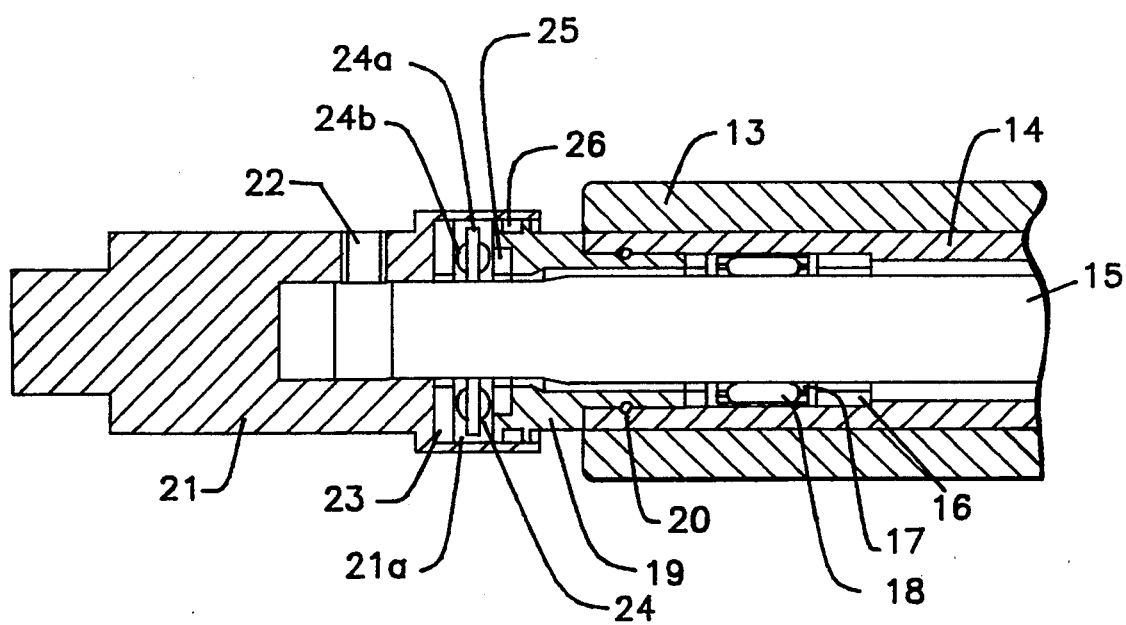
FIG. 3 shows a sectional view of the loose-boss top roller according to another embodiment of the present invention.

Referring to FIG. 3, in the loose-boss top roller, according to another embodiment of the present invention, 13 designates a hard rubber material, 14 a loose-boss, 15 an arbor, 16 a washer, 18 a needle bearing, 19 a joint, 20 a snap-ring, 21 an end bush, 22 a screw, 23 a thrust washer, 24 a thrust ball bearing and 25 a thrust washer. These elements are the same as those of FIG. 2. Therefore, the explanation of these elements is omitted. In this embodiment, the needle bearing 18 is attached in a shell 17 inserted into the loose-boss 14. A groove 26 for preventing leakage of grease and/or oil and the intrusion of cotton down is formed outside of the other end.

In the present embodiment, since the needle bearing 18 having the shell 17 is provided inside of the loose-boss 14, a process for hardening and grinding of the inside of the loose-boss 14 is not necessary. Since the groove 26 for preventing leakage of grease and intrusion of cotton down is provided with the joint 19 opposite to the hollow recess of the end bush 21, the leakage of grease in the thrust ball bearing 24 and the intrusion of the cotton down into the thrust ball bearing 24 is prevented.

What is claimed is:

1. A loose-boss top roller comprising:
   a loose-boss having opposite ends;
   a hard rubber material fixed on said loose boss;
   an arbor inserted in the loose-boss;
   needle bearings inserted between the loose-boss and the arbor within opposite ends of the loose-boss;
   a pair of joints each having one end thereof inserted and fixed into a respective end of the loose-boss out of contact with the needle bearings, respectively;
   an end bush fixed on each end of the arbor, each end bush having a hollow recess;
   first thrust washers placed in the hollow recesses of the end bushes;
   second end washers attached to the opposite ends of the joints; and
   thrust ball bearings inserted between the first thrust washers and the second end washers.

2. A loose-boss roller as set forth in claim 1, further including shells for holding the needle bearings and attached to an outside portion of the needle bearings inserted between the loose-boss and the arbor.

3. A loose-boss top roller as set forth in claim 1, further including groove means for preventing leakage of grease and intrusion of cotton down, said groove means being provided in each joint at a position opposite to the hollow recess of the respective joint at a position opposite to the hollow recess of the respective end bush.

4. A loose-boss top roller as set forth in claim 1, further including screw means for fixing the end bushes on the ends of the arbor.

* * * * *